Oct. 23, 1934.  C. S. NADLER  1,978,218

HYDRAULIC BEARING

Filed July 29, 1932    2 Sheets-Sheet 1

INVENTOR
Carl S. Nadler
BY
Knight Bro
ATTORNEYS

Oct. 23, 1934.     C. S. NADLER     1,978,218
HYDRAULIC BEARING
Filed July 29, 1932     2 Sheets-Sheet 2
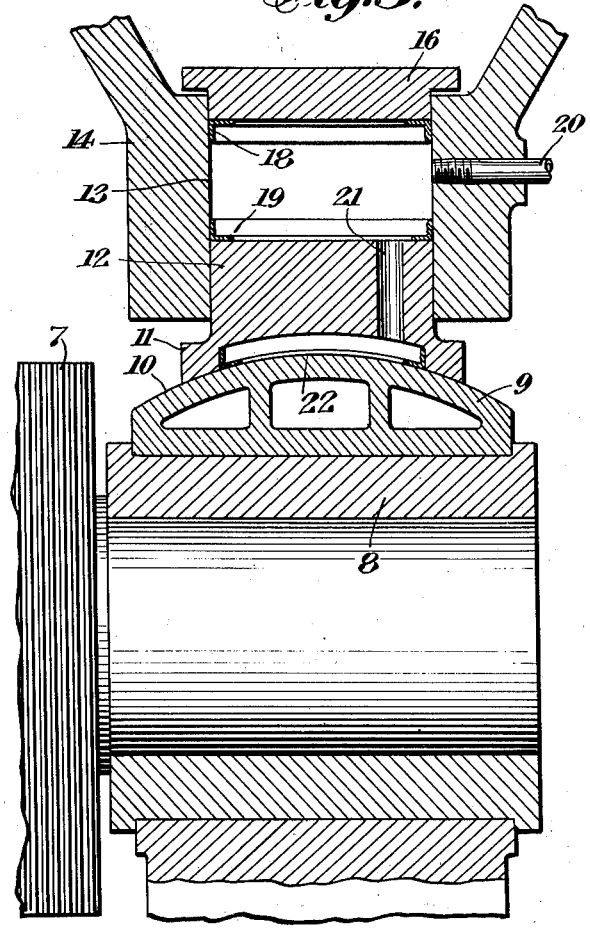
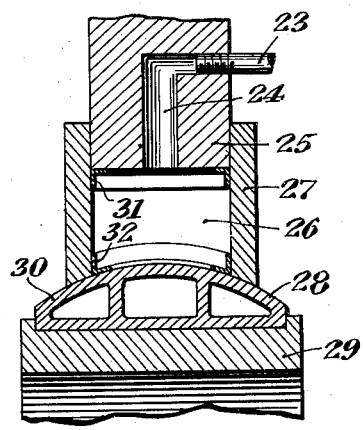
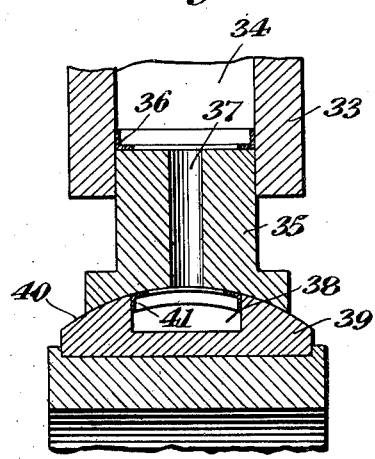
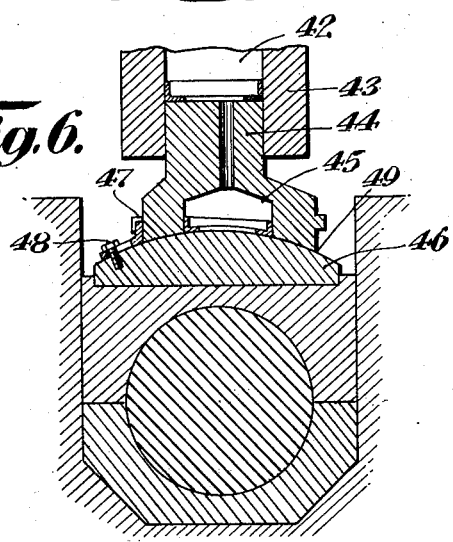
INVENTOR
Carl S. Nadler
BY
ATTORNEYS Patented Oct. 23, 1934

1,978,218

UNITED STATES PATENT OFFICE 1,978,218

HYDRAULIC BEARING

Carl S. Nadler, Houma, La.

Application July 29, 1932, Serial No. 625,959

5 Claims. (Cl. 308—9)

This invention relates more especially to hydraulic bearings for so-called "floating pressure rolls" upon which it is desired to maintain a load of predetermined magnitude for operating upon material of varying bulk passing thereunder. Thus, for example, in sugar cane mills, the bearings for the top pressure roll must be suitably mounted to permit an upward and downward movement of the pressure roll with respect to the cooperating fixed axis front and rear rolls as well as to permit a relative tilting of the axis of rotation of the pressure roll with respect to the fixed axes of said cooperating rolls. Devices of this character, as heretofore constructed, have been subject to certain drawbacks due to the transmission of high pressures to the bearings under non-uniform and eccentrically applied stresses which produce excessive friction between slidably contacting parts which transmit said pressures and undesirable strains on the movable as well as upon stationary parts. As exemplified in the pressure bearing for sugar cane mills, the direct application of pressure entirely through slidably contacting metal surfaces to the bearing of a floating pressure roll which is subject to uneven pressures during its rotating about a rising and falling axis, which at the same time is capable of tilting under the non-uniform mass passing between it and the rolls cooperating therewith, produces undesirable effects. For example, in a construction in which a pressure plate or block is interposed between the upper bearing block of a floating roll and the lower end of a hydraulic plunger with respect to which the pressure block is movable laterally and angularly, not only is there excessive friction between the plunger and pressure block, but also a tendency for the plunger to bind in its guides or frame (usually the mill housing cap). There is, moreover, an excessive amount of friction between the shaft journal and its bearing, which is usually accompanied by slippage between the rolls and the material passing therethrough. Incidentally, the difficulty of properly lubricating the heavily stressed parts is greatly increased, thus causing wear and breakage under the heavy burden imposed on the parts.

The present invention contemplates an improved construction for hydraulic bearings of the character referred to whereby the above difficulties may be avoided in a simple and effective manner by relieving slidably contacting metal parts from any desired amount of the total load that has heretofore usually been placed on these contacting relatively movable metal surfaces through which the pressure has been applied to the bearing. The application of the underlying principle of my invention is exemplified in the accompanying drawings, in which Figure 1 is a vertical transverse section of a sugar cane rolling mill with one of the end frames or standards shown in elevation.

Figure 3 is an enlarged section of the righthand bearing shown in Figure 2 with the roll journal shown in elevation.

Figure 4 is a diagrammatic section of a modified form of the hydraulic bearing.

Figure 5 is a fragmentary axial section of another embodiment, and

Figure 6 is a transverse section of another embodiment.

Figure 1:
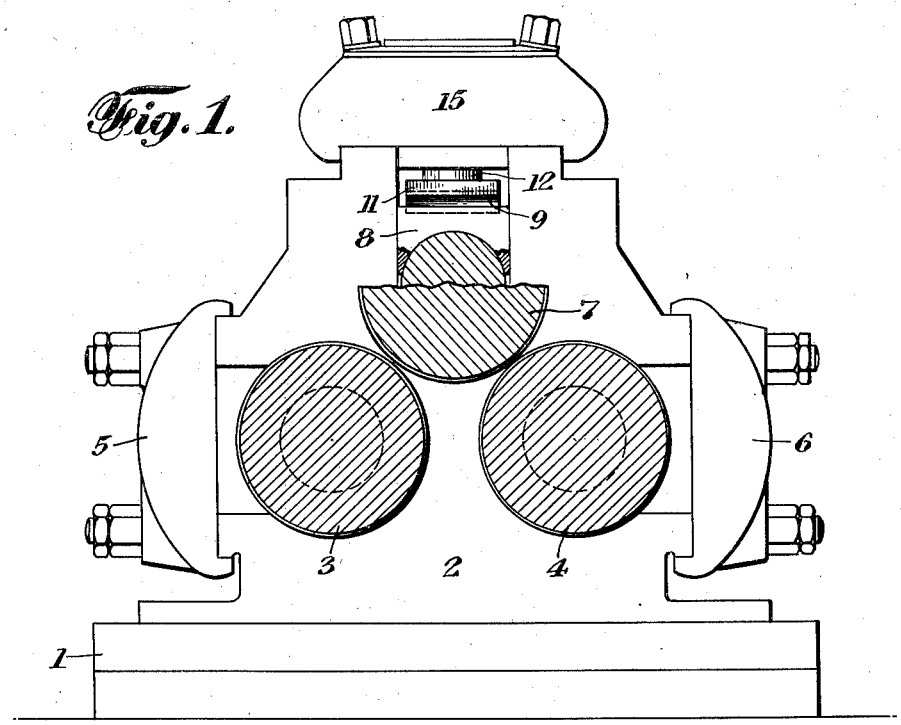
Figure 2:
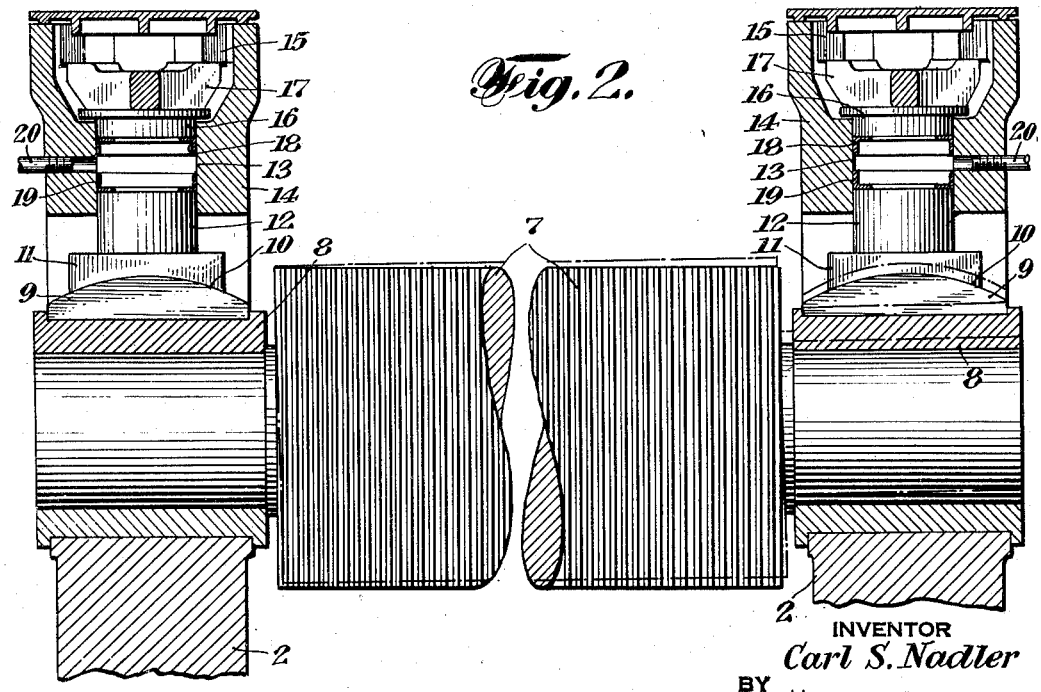
Figure 2 is an enlarged axial section of the same through the axis of the floating pressure roll, parts being broken away and parts shown in elevation.

According to the embodiment of my invention shown in Figures 1, 2 and 3, a main bed plate 1 serves to mount the axially-spaced side frames or standards 2 of a sugar cane crushing mill. Journalled within the side frames 2, as shown in Figure 1, are front and rear cane crushing rolls 3 and 4 with their axes of rotation arranged substantially in a common horizontal plane. Said front and rear crushing rolls are journalled in suitable bearings (not shown) which are maintained in suitable relative positions by means of bearing caps 5 and 6 which are bolted to the oppositely arranged side frames or standards. Mounted above and substantially centrally with respect to the front and rear rolls 3 and 4 (when there is no cane passing through the mill), is a top floating pressure roll 7 which, as shown somewhat diagrammatically in Figure 2, has its opposite ends journalled in suitable bearings which are suitably mounted to permit the floating pressure roll to move vertically and to permit a tilting movement of said roll during the application of pressure to its bearing. For the purpose of applying hydraulic pressures to the bearings of floating pressure rolls of this character, it has been customary to employ devices of various kinds, but such devices have not proved to be entirely satisfactory due to excessive friction developed between relatively movable parts, undue tendencies of one part to bind on another, and by reason of the difficulty met with in keeping the bearing surfaces of relatively movable, heavily loaded parts properly lubricated.

Referring now to Figures 2 and 3, the upper bearing block 8 for each journal of the floating pressure roll 7 carries a pressure block 9 which is provided with an upper cylindrical bearing surface 10 to adapt said pressure block to adjust itself angularly along the concave lower surface of the enlarged lower end 11 of a hydraulic plunger 12. Said plunger 12 is reciprocably mounted within the cylindrical inner wall 13 of a depending portion 14 of the mill housing cap 15 which is bolted to the side frame or pedestal, as shown in Figure 1. An upper plunger block 16, which closes the upper end of the space within cylindrical wall 13, may be held in position by means of a cross block 17 which interlocks with the mill housing cap 15. The upper circular corner of the cylindrical chamber thus formed may be sealed by an annular gasket 18, while the lower circular corner of said chamber may be sealed by an annular gasket 19. A pipe 20, which may be connected to any suitable source of pressure fluid, is adapted to supply pressure fluid under any desired pressure, say, for example, 200 tons acting upon the upper bearing block 8. According to the present invention, however, any desired portion of this pressure may be applied directly to the upper bearing block or interposed pressure block for the purpose of avoiding the transmission of this heavy pressure by means of the metal contacting surfaces between said plunger and the pressure block. For this purpose, the plunger 12 may be provided with an opening or passage 21 extending therethrough to a pressure fluid chamber 22 formed between the lower end of the plunger 12 and the top wall of the pressure block 9. It will be understood, of course, that the pressure block 9 may be integrally formed with the upper bearing block 8. As shown in Figure 3, the pressure fluid chamber 22 is formed as a recess in the bottom wall of plunger 12, which conforms to and is completed by the cylindrical top surface of the pressure block to permit angular adjustment of these parts whenever the axis of rotation of the roll 7 is tilted.

A modification of the above described form of my invention is shown in Figure 4, according to which a fluid pressure pipe 23 opens into a passage 24 which extends downwardly through a rigid cylindrical portion 25 of the rolling mill cap into a pressure fluid chamber 26 within an upwardly and downwardly movable cylindrical shell 27. According to Figure 4, a pressure block 28, which is carried by the upper bearing block 29 for the shaft journal, is provided with a cylindrical top surface 30 for accommodating the axial tilting movements of the shaft. Upper and lower sealing gaskets 31 and 32 are suitably arranged to render the pressure fluid chamber fluid-tight.

Referring now to the embodiment of my invention, shown in Figure 5, a hollow cylindrical portion 33 of the rolling mill cap represents a pressure fluid chamber 34, which receives pressure fluid from above, the lower end of said chamber being adapted to receive an upwardly and downwardly movable plunger 35 provided above with a fluid-tight gasket 36. A central passage 37 for pressure fluid extends downwardly through the plunger to a chamber 38 formed as a recess in the upper portion of a pressure block 39 having a cylindrical top surface 40 to permit angular movement of the pressure block with respect to the plunger. A cylindrically formed ring gasket 41 provides the necessary fluid tight seal between the slidably contacting surfaces.

As shown in Figure 6 of the drawings, a pressure fluid chamber 42 formed in a depending hollow portion 43 of the rolling mill cap and movably receiving a plunger 44, is adapted to receive pressure fluid from a pipe (not shown). The lower end of plunger 44 is provided with a pressure fluid recess 45 which is eccentrically disposed with respect to the axis of chamber 42 so that an angular movement of the plunger 44 around the axis of chamber 42 may be employed for varying the local area upon which the fluid pressure is applied to the top surface of the pressure block 46. In this, the varying angularity of the upward thrust of the pressure block 46, due to a variation in the axial tilting of the roll, can be equalized in greater or less degree. Suitable means, for maintaining an adjusted relation between plunger and pressure block, may be provided in the form of a notched ring 47 and a keeper 48. In this embodiment of my invention, the pressure block 46 should be provided with a spherical top surface 49, and the bottom surface of the plunger correspondingly formed.

The operation of my improved hydraulic bearing is evident from the foregoing description, as well as the advantages to be derived therefrom. It may be noted briefly, however, that the application of the load to the bearing of a floating pressure shaft by the introduction of pressure fluid to a chamber formed between the bearing portions which are continuously changing in their angular relations to each other, can be utilized to relieve the contacting metal surfaces of said bearing portions of any desirable portion of the friction-creating load.

I claim:—

1. In a device of the character described, the combination with a mill roll rotatable about a tiltable axis, of a pressure-receiving member partaking of the tilting movements of said mill roll at one end thereof, a hydraulic press provided with a reciprocatory plunger interengaging with said pressure-receiving member in a curved surface for accommodating the oscillating movements of said pressure-receiving member in respect to said plunger, the contacting surfaces of said pressure-receiving member and reciprocatory plunger forming a closed border extending around a pressure fluid chamber formed between spaced contiguous wall portions of the pressure-receiving member and plunger, and means for supplying pressure fluid to said pressure fluid chamber under a predetermined pressure, said pressure-receiving member being provided with a predetermined pressure area whereby any desired amount of fluid pressure may be applied directly to said pressure-receiving member.

2. In a device of the character described, the combination with a mill roll rotatable about a tiltable axis, of a hydraulic press including a pressure block partaking of the tilting movements of said mill roll at one end thereof, a stationary cylindrical part provided with an inlet for pressure fluid, a plunger reciprocably engaging said stationary cylindrical part and interengaging with said pressure block in a curved surface suitably formed to accommodate the oscillating movements of said pressure block in respect thereto, the contacting portions of said pressure block and reciprocatory plunger forming a border around an area of predetermined magnitude of the contiguous surface of said pressure block and forming therewith a pressure fluid chamber whereby a predetermined amount of the total pressure exerted by said hydraulic press may be applied as fluid pressure acting directly on said pressure block.

3. In a device of the character described, the combination with a mill roll rotatable about a tiltable axis, of a pressure block partaking of the tilting movements of said mill roll at one end thereof, a hydraulic press provided with a main pressure fluid chamber and including a reciprocatory plunger interengaging with said pressure block in a curved surface for accommodating the oscillating movements of said pressure block in respect thereto, the contacting portions of said pressure block and reciprocatory plunger defining an auxiliary pressure fluid chamber between spaced contiguous wall portions of the pressure block and plunger, the pressure area of said pressure block exposed to the pressure fluid in said auxiliary pressure fluid chamber being definitely proportioned to the cross-sectional area of said reciprocatory plunger whereby a predetermined amount of the total pressure applied to said pressure block may be applied hydraulically directly to said pressure block, and means for supplying pressure fluid to said pressure fluid chambers.

4. In a device of the character described, the combination with a floating roll rotatable about a tiltable axis, axially spaced bearings for said floating roll constructed and arranged to partake of the axis-tilting movements of said roll, and means for applying pressure to each of said bearings, said pressure applying means including a pressure block member partaking of the movements of said bearing, a reciprocatory plunger block oscillatably contacting with said pressure block in a surface formed and arranged to accommodate the axis-tilting movements of said floating roll, and a hydraulic cylinder within which said reciprocatory member reciprocates and with which it forms a pressure fluid chamber, one of said blocks being provided with a pressure fluid cavity closed by the curved bearing wall of the other of said blocks and having a predetermined cross-sectional area proportioned to the effective pressure area of the reciprocatory member acted upon by the pressure fluid in said pressure fluid chamber.

5. In a hydraulic bearing for a shaft rotatable about a tiltable axis, the combination with a hydraulic cylinder, of a piston member reciprocable therein and forming therewith a pressure-fluid chamber, a pressure-block member constructed and arranged to partake of the axis-tilting movements of said shaft, said piston and pressure-block members being provided with interengaging bearing surfaces, a pressure fluid supply pipe through which pressure fluid is supplied to said pressure fluid chamber under a predetermined pressure, one of said members being provided with a pressure fluid recess having a predetermined cross-sectional area in respect to the cross-sectional area of said piston member and the other of said members forming therewith an auxiliary pressure fluid chamber, said piston being provided with a pressure fluid passage extending between the pressure fluid chamber in said hydraulic cylinder and said auxiliary pressure fluid chamber whereby any desired portion of the total pressure developed by said pressure fluid may be applied directly to said pressure-block member.

CARL S. NADLER.